Patented Nov. 10, 1931

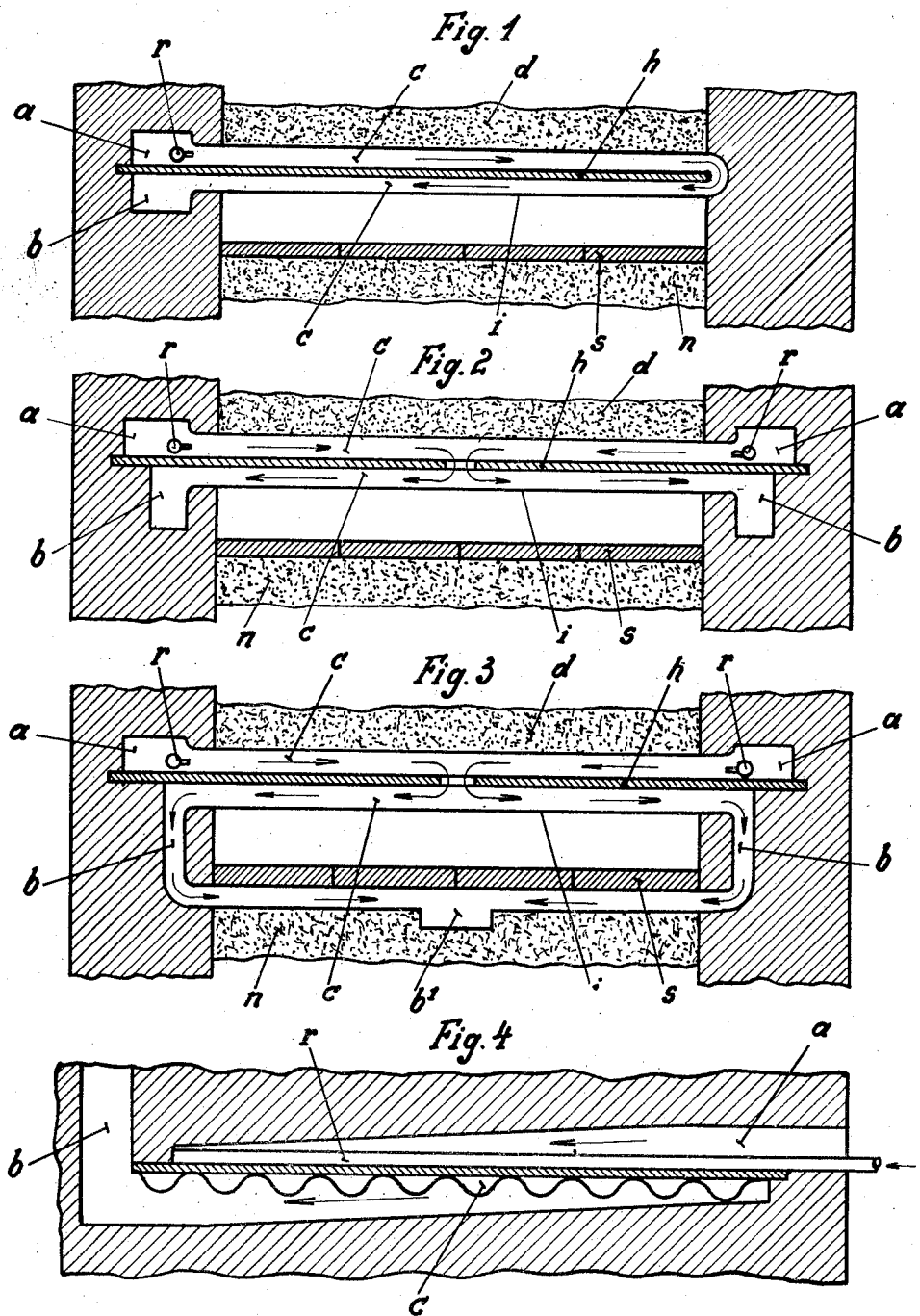

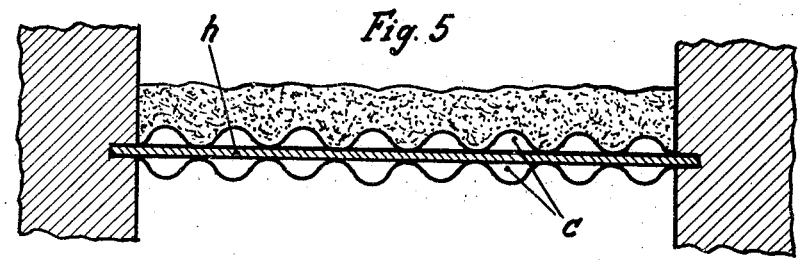
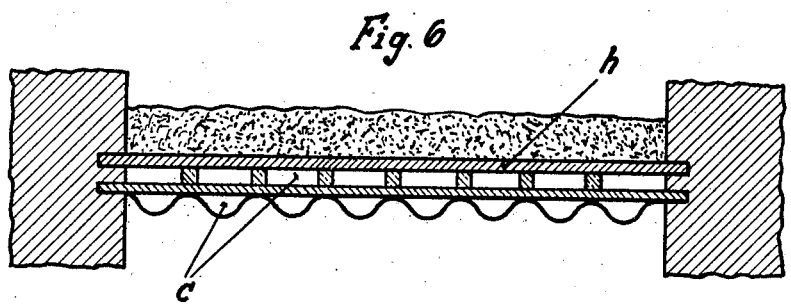
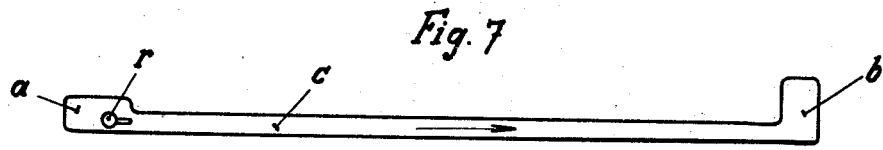
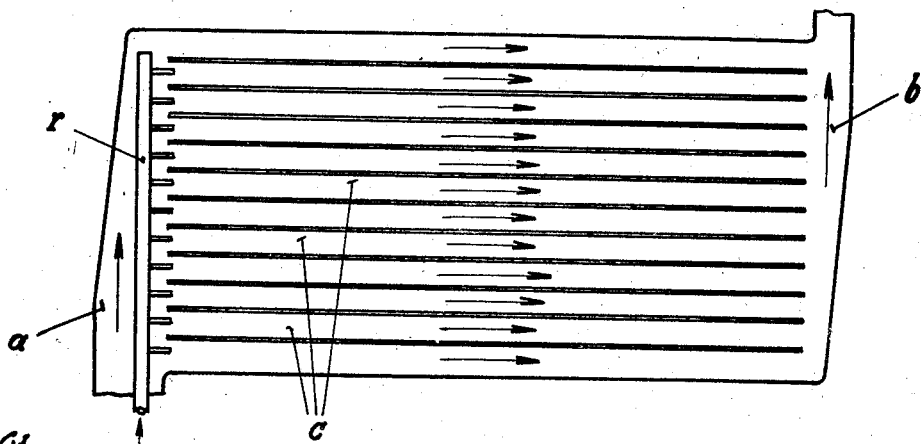

1,831,768

UNITED STATES PATENT OFFICE

WILHELM OTTO, OF BERLIN, GERMANY

HEATING FLUE INSTALLATION FOR BAKING OVENS

Application filed April 30, 1930, Serial No. 448,769, and in Germany April 29, 1929.

The main problem of the heating of baking ovens consists in that the heat produced in the combustion room is transmitted upon the walls of the baking chamber with maximum drop of temperature and absolutely uniformly.

The question of heat exchange has been solved by the water heating tubes, this system permitting however to produce only little temperature difference between the baking chamber and the heating bodies of the same, as the critical temperature of the water requires certain limitations. In the other known systems the heat exchange is attained in suitable limits either by great accumulating masses or by heat throttling, this being, however, connected also with considerable losses of heat.

Counter-current heating arrangements, in which for instance on the forward travel of the heating gases the ceiling of the lower hearth and at the backward travel the floor of the upper hearth is heated, have become known, also brick ovens, in which the flues extend forward and backward in zig-zag. Unknown was however an arrangement, in which the heating effect of the forward flowing heating gases acted preponderently upon the back flowing gases to prevent the same against a drop of temperature notwithstanding the delivery of heat.

This invention relates to a heating arrangement of baking ovens, in which the heating gases are conducted in such a way that the forward- and backward-movement of the same takes place between an outer wall, which is not well heat conducting and a wall adjacent to the hearth which favors the heat radiation.

Several embodiments of the invention are illustrated by way of example in the accompanying drawings in which:

Fig. 1 shows the furnace of the baking oven in longitudinal section.

Fig. 2 is a similar view showing a double sided arrangement of the heating flues.

Fig. 3 is a similar view showing a modification of Fig. 2.

Fig. 4 shows in longitudinal section the two main flues.

Fig. 5 shows a flue of undulated sheet metal plates.

Fig. 6 shows a flue of undulated sheet metal plates and refractory material.

Fig. 7 shows in side elevation and

Fig. 8 in top plan view a third form of construction of the heating plant.

Referring to Fig. 1 the outer wall, which is a bad conductor of heat, is designated by $d$, and $i$ designates the wall adjacent to the hearth which favors the heat radiation. A partition $h$, situated between the two flues serves to ensure the correct heat delivery from the forward flowing heating gas to the backward flowing heating gas, whereby maximum heat drop, perfect equalization of temperature and favorable heat delivering to the baking chamber are obtained, that is best heat output from the fuel.

Fig. 2 illustrates a double sided arrangement of the heating flues. The reversing points are situated approximately at the center of the hearth. By means of gas burners $r$ arranged in the distribution channels $a$ the production of the heating gases takes place directly before they enter into the channel $c$. The channels $b$ are designed for collecting and conveying the waste gases.

In order to better utilize the heating gases, the two lateral discharge channels $b$ may be united, as shown in Fig. 3, below the hearth floor to a common channel $b1$, so that the return channels $c$ extend along the sides of the hearth to below and then under the floor to the common channel $b1$.

Instead of the heat insulating layer $n$ the same arrangement as in the hearth ceiling may be provided under the hearth floor $s$, the return flow of the heating gases passing again close to the hearth room.

Fig. 4 shows a longitudinal section through the main channels $a$ and $b$. The cross sections of the channels widen towards their open ends, in order to preserve at all points uniform speed of the heating medium.

As shown in Fig. 5, the return channels or flues $c$ may be built of undulated sheet metal plates. For higher temperatures they are preferably made of refractory material, such as chamot or the like, or they may be made of both materials combined, as shown in Fig. 6.

In Figs. 7 and 8 a heating arrangement is shown in side elevation and top plan view in stretched, not yet reversed form. The open ends of the main channels $a$ and $b$ are situated at two diagonally opposite corners of the developed surface. The distances between the open ends are therefore over all branches $c$ of the same dimensions, so that they exert the same heating effect upon the baking chamber. Uniform distribution of the heating medium in the one direction and maintaining constant of the temperatures in the other direction of the heated surface ensure therefore a uniform baking heat through the whole hearth.

If hot air or gases from combustion of any kind are to be used for heating, they are supplied into the channels $a$ instead of the gas burners $r$ and the air for combustion for the same.

What I claim, is:

1. A heating flue installation for baking ovens, comprising in combination with the baking chamber, heat supply channels in the ceiling of the baking chamber, lateral branches extending from the said channels, baking spaces, insulated walls arranged above the said branches, and waste gas channels disposed in the lower portions of the said baking spaces, the said branches extending forward, downward and backwards between the said walls and baking spaces and opening with their lower ends into the said waste gas channels.

2. A heating flue installation according to claim 1, in which the cross sections of the heat supply and waste gas channels gradually expand towards their open ends on the opposite side.

3. A heating flue installation according to claim 1, in which the lateral branch channels positioned between the heat supply and waste gas channels consist of a diathermic material.

In testimony whereof I have hereunto set my hand.

WILHELM OTTO.